US005226187A

United States Patent [19]

Borders et al.

[11] Patent Number: 5,226,187

[45] Date of Patent: Jul. 13, 1993

[54] FOOT SECTION FOR BIRTHING BED

[75] Inventors: Richard L. Borders, Cincinnati, Ohio; Robert T. Fussner, Brookville, Ind.; Michael W. Hamilton, Harrison, Ind.; Desmond L. Ransom, Dillsboro, Ind.

[73] Assignee: Hill-Rom Company, Inc., Batesville, Ind.

[21] Appl. No.: 914,887

[22] Filed: Jul. 16, 1992

Related U.S. Application Data

[63] Continuation-in-part of Ser. No. 685,188, Apr. 15, 1991, Pat. No. 5,157,800.

[51] Int. Cl.[5] .................................. A01G 7/06

[52] U.S. Cl. .................................. 5/602; 5/619; 5/624; 5/648

[58] Field of Search .................. 5/602, 619, 624, 648, 5/649, 661

[56] References Cited

U.S. PATENT DOCUMENTS

| | | | |
|---|---|---|---|
| Re. 21,972 | 12/1941 | Demcak | 269/325 |
| 973,453 | 12/1909 | Peak | 5/624 X |
| 2,067,891 | 1/1937 | Comper | 269/328 |
| 2,552,370 | 5/1951 | Curtis | 269/328 |
| 2,605,151 | 7/1952 | Shampaine | 5/602 |
| 2,757,058 | 7/1956 | Broesel | 269/328 |
| 3,100,129 | 8/1963 | Adolphson | 269/328 |
| 3,318,596 | 5/1967 | Herzog | 5/619 |
| 3,318,596 | 5/1967 | Herzog | 269/328 |
| 3,334,951 | 8/1967 | Douglas, Jr. et al. | 269/328 |
| 3,599,963 | 8/1971 | Grover | 269/325 |
| 4,139,917 | 2/1979 | Fenwick . | |
| 4,225,127 | 9/1980 | Strutton | 269/325 |
| 4,411,035 | 10/1983 | Fenwick . | |
| 4,426,071 | 1/1984 | Klevstad | 269/328 |
| 4,639,954 | 2/1987 | Speed | 5/602 |
| 4,805,249 | 2/1989 | Usman et al. | 5/60 |
| 4,894,876 | 1/1990 | Fenwick | 5/602 |
| 5,157,800 | 10/1992 | Borders | 5/602 |

FOREIGN PATENT DOCUMENTS

| | | | |
|---|---|---|---|
| 1098671 | 2/1961 | Fed. Rep. of Germany | 269/325 |
| 2911743 | 10/1979 | Fed. Rep. of Germany | 269/328 |
| 3500313 | 7/1985 | Fed. Rep. of Germany | 269/328 |
| 150960 | 4/1981 | Japan | 269/325 |
| 262323 | 5/1971 | U.S.S.R. | 269/328 |

*Primary Examiner*—Michael F. Trettel
*Attorney, Agent, or Firm*—Wood, Herron & Evans

[57] ABSTRACT

A foot section for a birthing bed has a central panel and two lateral plates that function, in an inclined attitude, as footrests and in a vertical attitude as posts for receiving calf supports. The calf supports are stored in holsters on the underside of the footrests. The mattress is in three sections, with the outboard sections being hinged to a central section so as to be swung upwardly upon the central section thereby exposing the footrests without having to remove the whole foot section.

The central panel can be removed with the mattress and is adapted to be stood on its end for temporary storage, thereby conserving floor space.

1 Claim, 8 Drawing Sheets

FOOT SECTION FOR BIRTHING BED

This application is a continuation-in-part of application Ser. No. 07/685,188 filed Apr. 15, 1991, now U.S. Pat. No. 5,157,800.

This invention relates to a birthing bed and more particularly to a foot section for a birthing bed.

Conventionally, a birthing bed has a patient support consisting of a head panel, a seat panel and a foot panel with a mattress covering the panels. The foot panel and its mattress is removable to expose underlying footrests so that the patient can sit up and press her feet against footrests during labor. The removal of the foot panel also permits the mounting of calf supports in the space vacated by the foot panel. The removal of the foot panel permits the doctor to slide a footstool into the space vacated by the foot panel so as to be in a position to assist in delivery.

The current birthing bed, described above, has some disadvantages. After the patient has an epidural, the shifting of the patient's numbed legs from the foot panel to the footrests is at least a two-nurse operation, one nurse holding the patient's leg while a second nurse removes the foot panel. Further, the calf supports, when used, must be retrieved from storage and thereafter mounted on the bed.

BRIEF SUMMARY OF THE INVENTION

The objective of the invention has been to provide a foot section for a birthing bed that reduces the number of people required to attend the patient and which simplifies some of the procedures attending the birthing process, particularly where they relate to the making available different types of equipment, e.g., the footrest, the calf support and the foot panel, at the foot end of the bed.

The objective of the invention is attained by providing a foot section wherein the mattress has side sections that are removable or that fold over upon the center section to expose underlyinq support plates that serve as footrests on each side of the central panel. The footrests ratchet up to any angular position including past vertical position.

The center section is removably mounted on the bed frame. Each footrest is mounted, completely independently of the center section, for outward swinging movement about a vertical axis and for upward pivoting movement about a horizontal axis.

Each footrest contains, on its undersurface, a holster to carry a calf support. Each calf support is removable and mounted on the upper end of the footrest when the footrest is in a substantially vertical position. An improved ball joint is provided on the calf support for the convenient universal adjustment of the calf support.

The foot panel, with its mattress, is easily removable and is adapted to stand on its front edge so as to take up as little space in the birthing room as possible.

The mattress mounted on the foot panel is semi-permanently attached with snaps so that it can easily be removed for cleaning but nevertheless stays in position when in its operative position.

There are several important advantages to the structure heretofore described.

The three-section foot panel mattress permits each underlying footrest to be quickly and easily exposed by removing or by flipping the side mattress section over upon the center section. This enables one nurse to place the numbed legs or feet of the patient on the footrest. In doing so, the patient's legs are temporarily supported on the center portion of the foot section. The footrests are exposed and ratcheted to the desired angular position. After each footrest is exposed and raised, the patient's foot is placed on it.

Where calf supports are to be employed in the birthing process, they can quickly be set up. The footrest is simply ratcheted to a past vertical position and the receptacles that support the calves are removed from the holsters on the underside of the footrest and dropped into pockets on the upper end of each footrest. The angular position of the calf receptacle with respect to the footrest on which it is mounted is easily adjusted by the improved ball and socket connection. The footrests may also be swung horizontally outwardly about vertical axes and thus adjusted to the comfort of the patient.

As another feature of the invention, the foot panel is provided with a very simple but nevertheless reliable attachment to the frame of the birthing bed so that it can be quickly removed. It also has a stand for supporting it on its front edge, thereby minimizing the space in the birthing room for its storage.

BRIEF DESCRIPTION OF THE DRAWINGS

The several objectives and features of the invention will become more readily apparent from the following detailed description taken in conjunction with the accompanying drawings in which.

DETAILED DESCRIPTION OF THE INVENTION

Figure 1A:
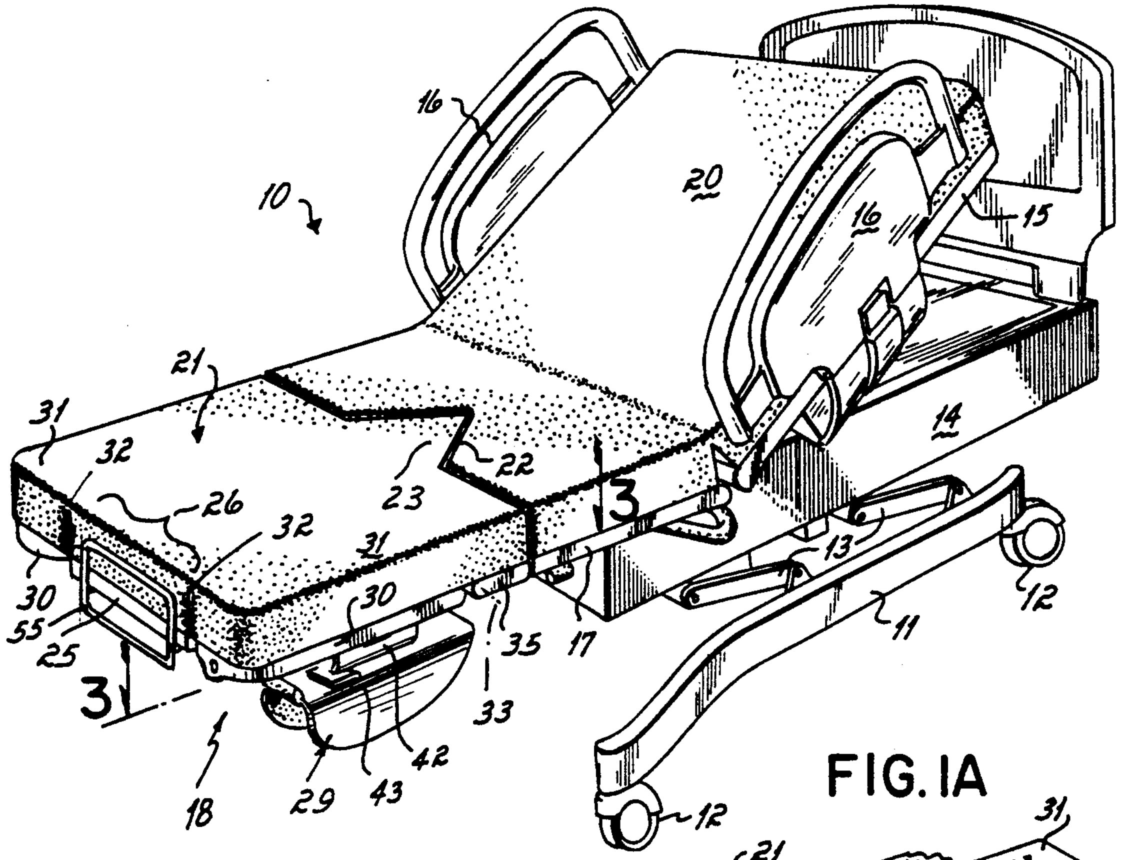
FIG. 1A is a perspective view of a birthing bed in accordance with the present invention.

A birthing bed 10 in accordance with the present invention is shown in FIG. 1A. The bed has a base 11 which has casters 12 providing rolling support along a floor. A parallelogram linkage 13 connects a bed frame 14 to the base. The bed frame supports a head panel 15 with side guards 16, a seat panel 17 and a foot section 18. A head end mattress section 20 covers the head panel 15 and the seat panel 17. A foot section mattress 21 covers the foot section 18. Optionally, the forward edge of the seat panel and mattress 17 has a V-shaped recess 22 which, when the center section of the foot section 18 is removed, facilitates delivery of the baby. The recess 22 is otherwise filled by a triangular projection 23 on the foot section 18 that mates with the recess 22.

Figure 1B:
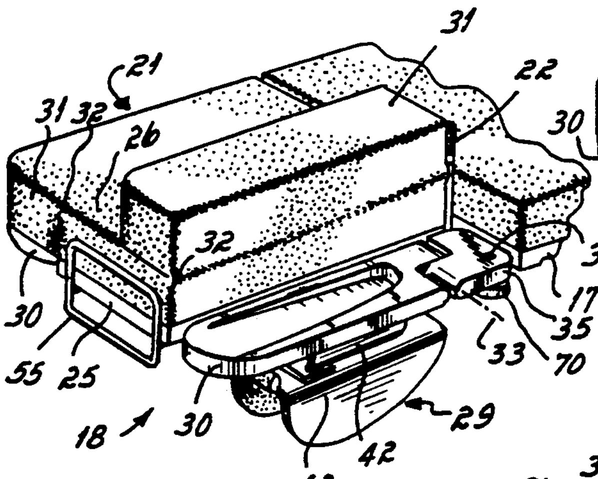
FIG. 1B is a fragmentary perspective view of the foot section of the birthing bed with a section of the mattress folded upon the center panel.
Figure 1D:
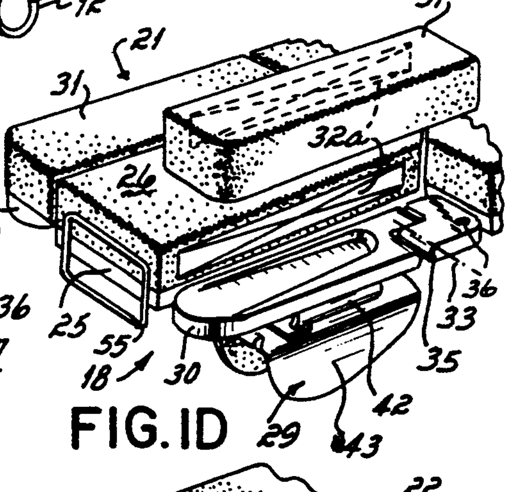
FIG. 1D is a fragmentary perspective view of an alternative embodiment of the foot section.

The foot section 18 has a subframe 24 and central panel forming the center section of the foot section 25, the foot section 18 supporting a center mattress section 26. Although shown solid for clarity, the center panel 25 is a hollow, rigid, blow-molded plastic member as best shown in the plan view of FIG. 3. As shown in FIG. 4A, the central panel 25 is mounted on an aluminum frame 27 of the subframe 24 and is bolted to it. Alternatively, the pan 25 could be fabricated of aluminum and welded to the aluminum frame 27. On each side of the panel 25 is a plate 30 forming a footrest. As shown in FIG. 1B, the plate 30 supports a lateral mattress section 31 which is hinged by a plastic covering at 32 to the central mattress section 26. A calf support 29 is mounted on the lower surface of plate 30 in a manner described below. As shown in FIG. 1D, the lateral mattress section 31 can be completely removable and attachable by a hook and loop connection **32*a*** formed on the abutting surfaces of each lateral section and central section, respectively.

Figure 9:
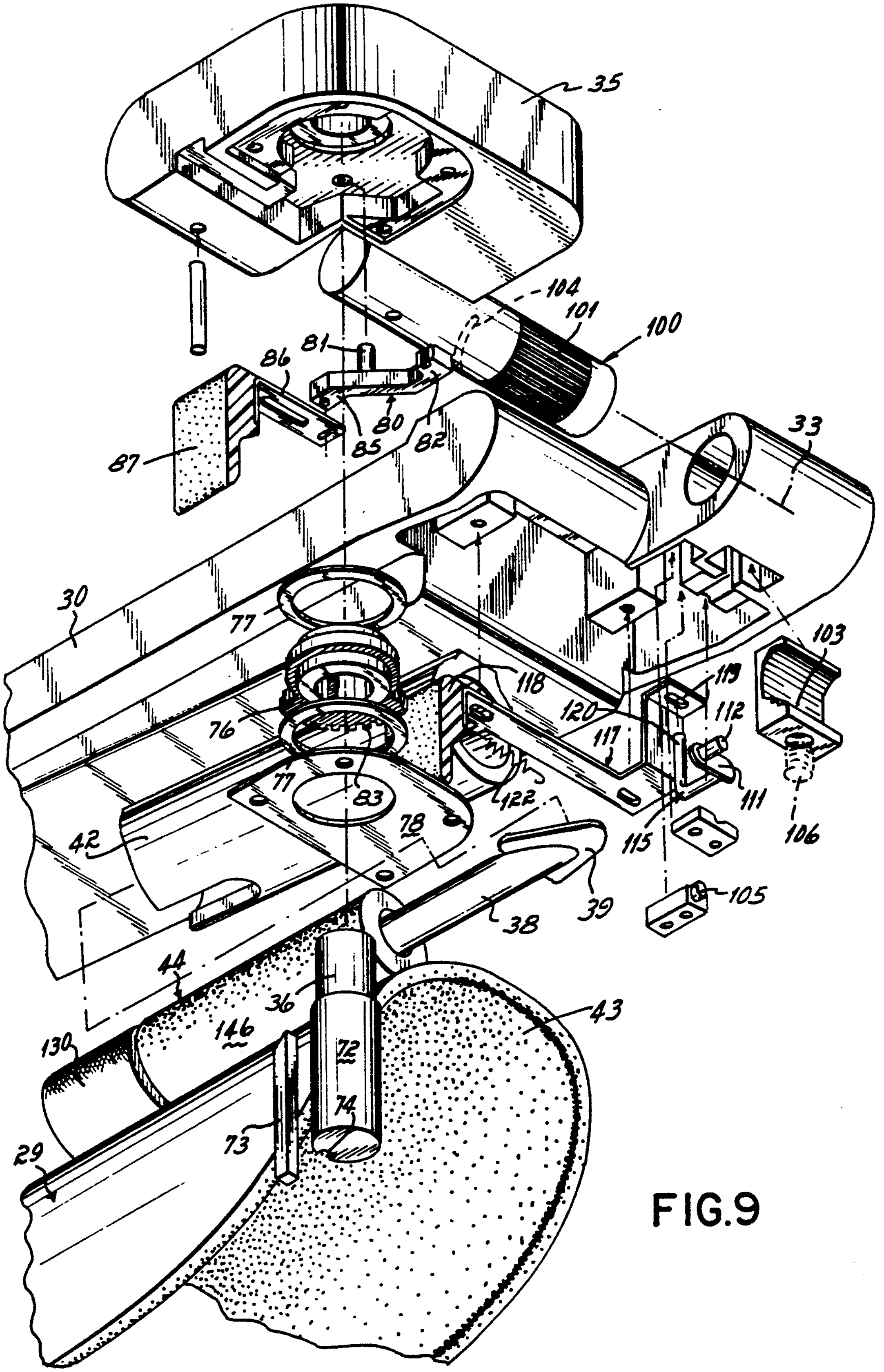
FIG. 9 is a disassembled perspective view taken from the underside of the footrest.
Figure 11:
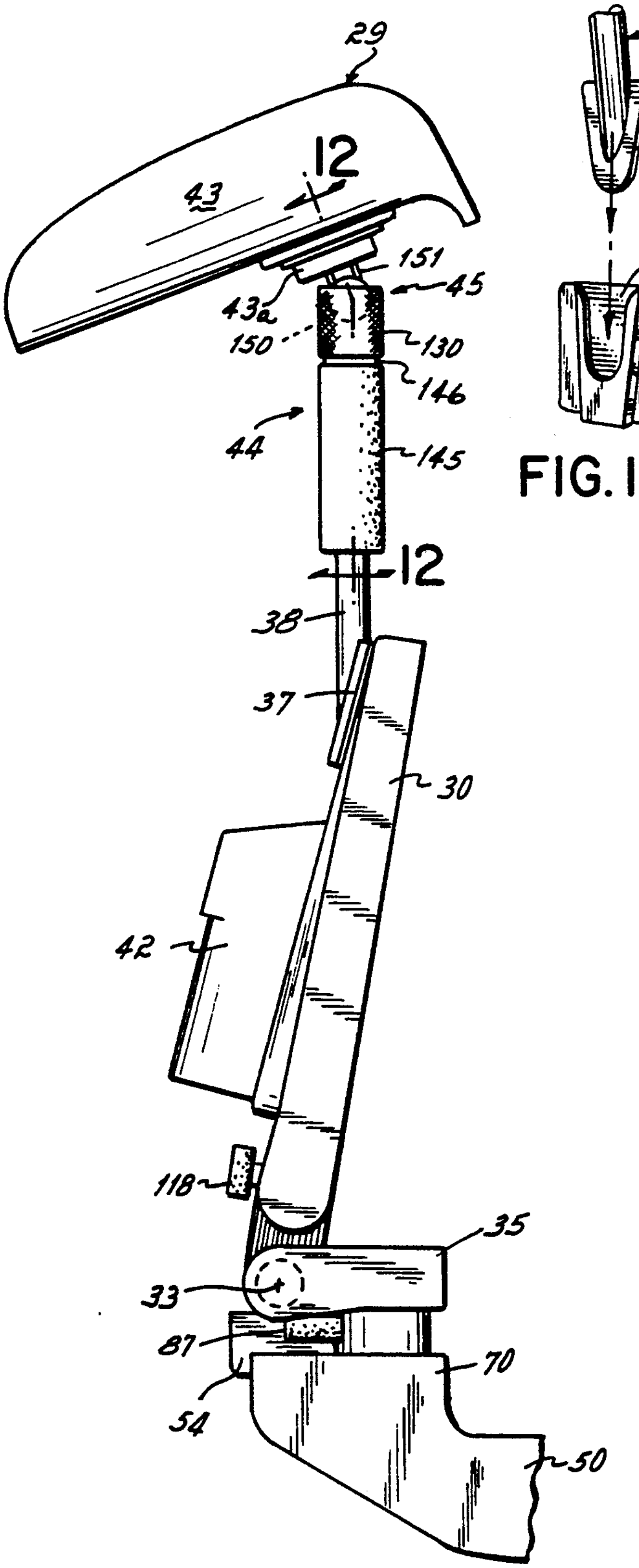
FIG. 11 is a side elevation of the footrest converted to a calf support.
Figure 10:
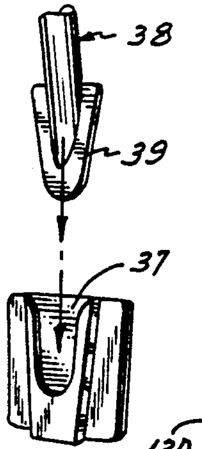
FIG. 10 is a disassembled perspective view of the calf support mount.

The plate 30 is pivoted on a horizontal axis at 33 to a rotatable block 35, the block being pivoted about a vertical axis on a pin 36. The pivot connection between the plate 30 and the block 35 permits a ratcheting upwardly of the plate 30 so that it can be positioned at any one of a plurality of angular relationships at 9° intervals from horizontal 117°, by a mechanism shown in FIGS. 5 to 9 and to be described in detail below. As shown in FIGS. 10 and 11, the plate 30 has a pocket 37 on its underside adjacent its free end. The calf support 29 has a post 38 with a spade 39 on its lower end for insertion into the pocket 37 to mount the calf support to the footrest. The calf support, when in storage, is slidably mounted in a holster 42 on the underside of the plate 30. See also FIGS. 2A and 2B for the configuration of the holster.

Figure 12:
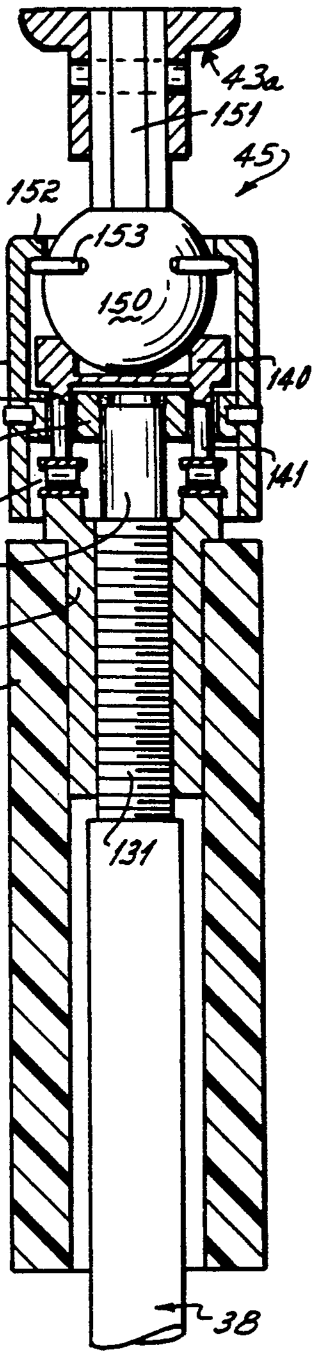
FIG. 12 is a cross-sectional view taken along lines 12—12 of FIG. 11.

The calf support has a receptacle 43 which receives the patient's calf, the receptacle being generally U-shaped in cross section. A post 44 is connected by a ball joint 45 (shown in detail in FIG. 12 and to be described later) to a casting **43*a* to which the receptacle 43 is bolted. The receptacle can be fixed in one of an infinite number of angular positions universally about the ball joint, as will be seen from the detailed description of FIGS. 11 and 12**.

As shown in FIGS. 2A, 2B, 3, 4 and 4B, the block 35 is mounted on forwardly-extending arms 50 which project integrally from a transverse beam 51 that supports the foot section. The arms 50 and beam 51 are a single yoke casting. Each arm has a pair of horizontally-spaced, vertically-oriented lugs 52, 53. The foot panel 25 has laterally spaced, depending tongues 54 fixed to the frame 27 at its rearward end. The tongues 54 fit between the lugs 52, 53 to provide removable support of the foot panel 25. As can be seen from FIG. 2B, the foot panel can easily be removed simply by lifting it vertically, with a slight pivoting of the front end downward, out of the space between the adjacent lugs 52, 53. As best seen with reference to FIG. 4B, the geometry among the lugs 52 and 53 and the tongue 54 provides assurance that the tonque will not inadvertently ride out of its normal position between lugs 52, 53 when weight is applied to the footrest. It can be seen that lug 53 has an inclined surface **53*a* that overlies the point 54*a* on the lug 54 that engages the surface 53*a*. Therefore, as a load is applied to the footrest, tending to rotate the tongue counterclockwise with respect to the lugs, the point 54*a* is jammed against the surface 53*a***, thereby preventing it from riding up and out of the space between the lugs.

Additionally, the lug 52 has a corner **52*a* that engages a corner 54*b* on the lug 54. Those two corners have a small radius which resists any pivoting of the tongue 54 with respect to the lug 52**.

As indicated, the foregoing geometry effectively blocks the inadvertent slipping of the tongue 54 out of the space between the lugs 52, 53.

At the front edge of the front panel is a rectangular-shaped stand 55 mounted on the frame 27. The stand 55 provides a handle for grasping the foot panel and provides a floor-engaging support to hold the foot panel in a vertical orientation when it has been removed from the birthing bed.

Each tongue 54 has forward projections 56 normally lying under lug 52. The projections prevent the tongue from rising out of the space between lugs 52 and 53 when the front end of the foot panel is tilted up, as by a patient placing his knee on the projection 23 or by lifting on stand 55. The stand therefore can be used as a handle to pull on the bed without dislodging the foot panel.

Figure 3:
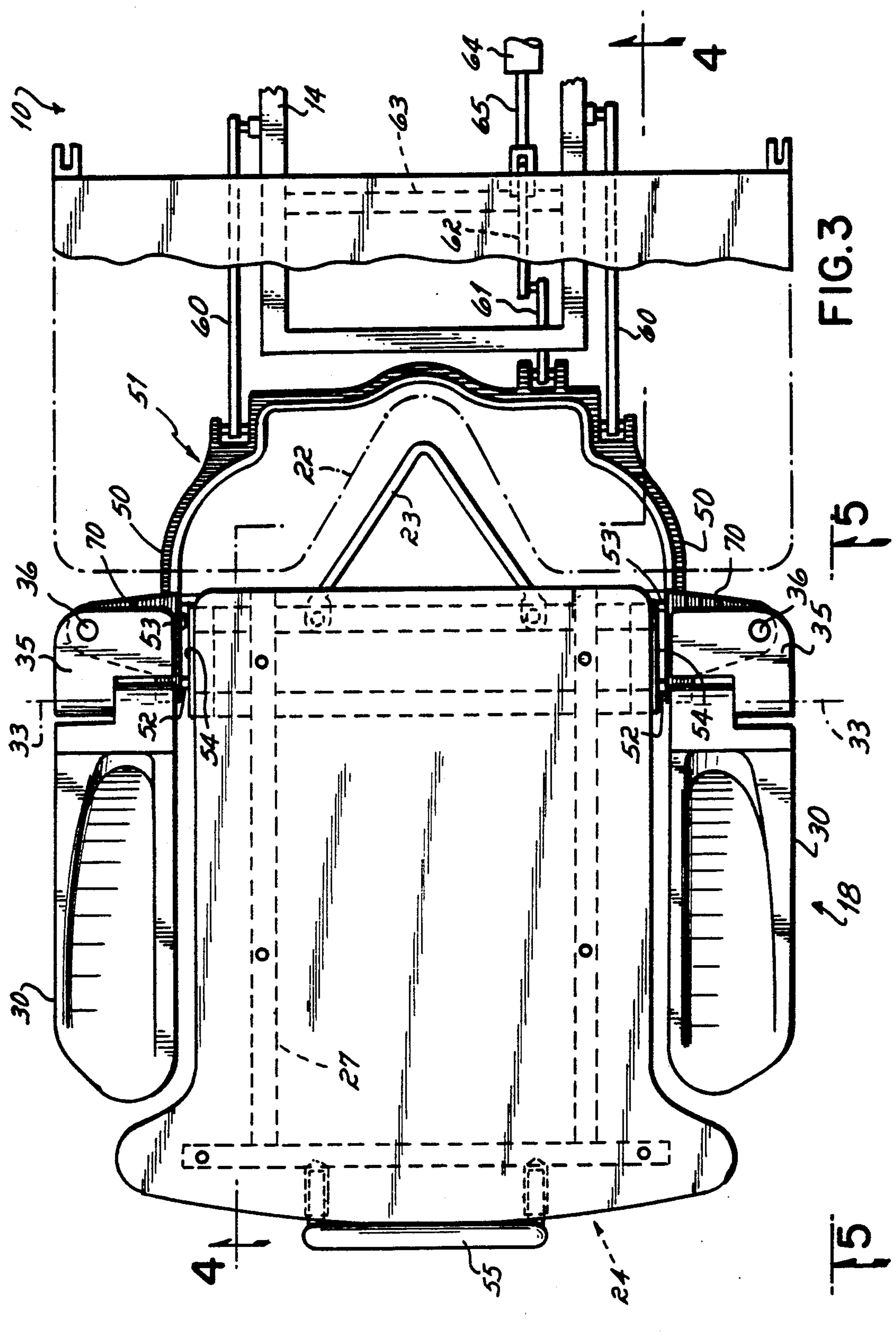
FIG. 3 is a plan view of the foot section and taken generally in the direction of the arrows 3—3 in FIG. 1A. The shape of the foot end is illustrated in the preferred form (the shape being diagrammatic in FIGS. 1A-1D) with the mattress removed.
Figures 4, 4A:
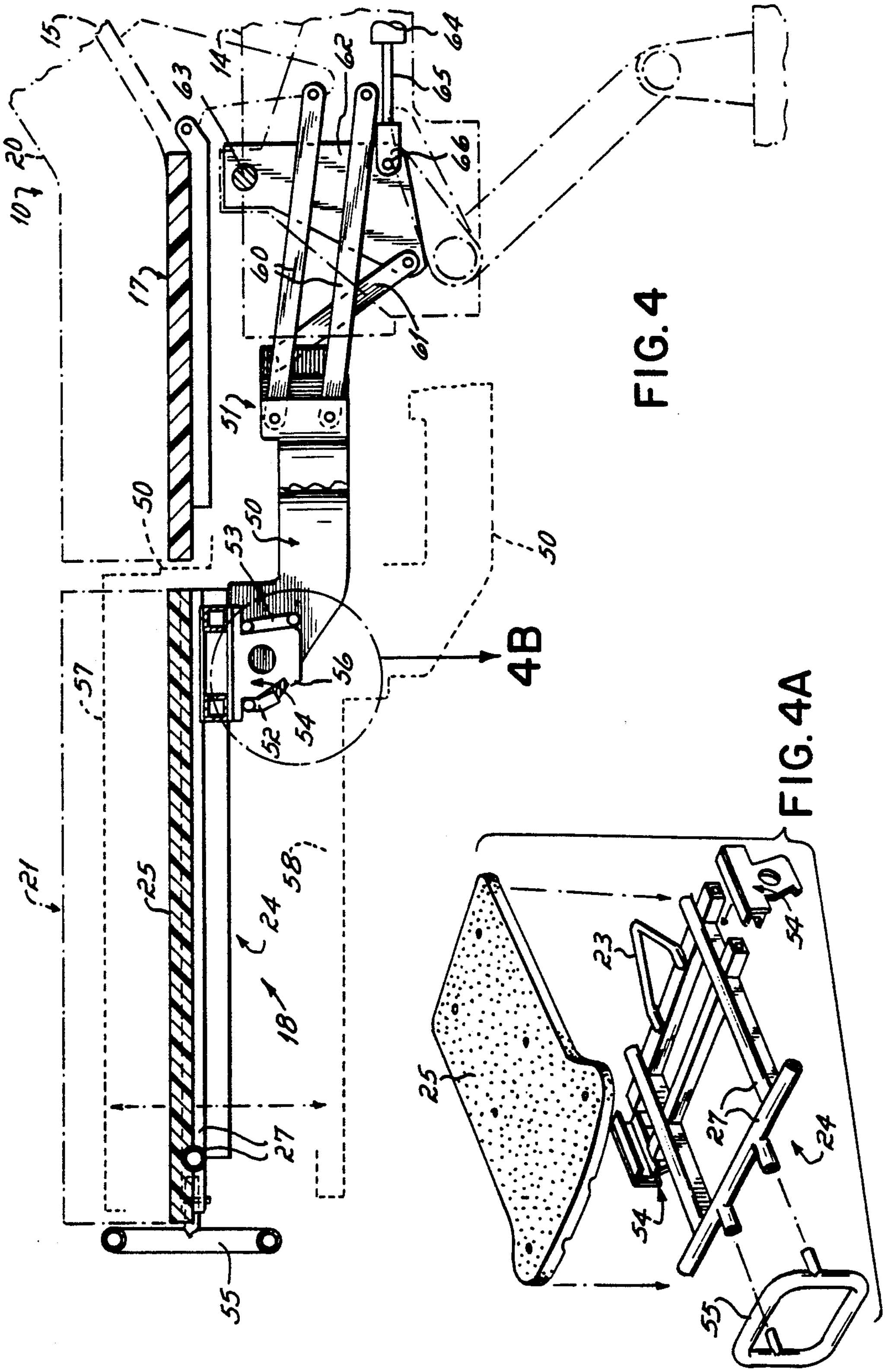
FIG. 4 is a cross-sectional view taken along lines 4—4 of FIG. 3 showing the mechanism for raising and lowering the foot support and foot section.
FIG. 4A is a disassembled perspective view of the center panel of the foot section.

Referring to FIGS. 3 and 4, the transverse beam 51 that provides the main support for the foot section is connected, on each side, to a parallelogram linkage 60 which permits the foot panel to move from an upper position 57 shown in dashed lines, through an intermediate position wherein the arms 50 are shown in full lines to a lower position 58 where the arms 50 are shown in dashed lines. The transverse beam 51 is raised and lowered by a drive link 61 connected to a bellcrank lever 62 pivoted to the bed frame at 63. An electric actuator 64 is connected by a pivot pin 66 on the bellcrank lever 62 to cause the bellcrank lever to pivot between the raised and lowered positions.

The pivotal support for each footrest 30 is shown in FIGS. 5-9. Each arm 50 has an outwardly-directed flange 70 having a vertical bore 71. A shaft 72 is press fit into the bore and is held against rotation by a key 73 fitting in slots 74 in the shaft and 75 in the flange 70. A quarter gear 76 is slidably mounted on the shaft and keyed to it by the key 73. Bearings 77 seat on top and bottom of the quarter gear between plate 78 and block 35. The plate 78 is mounted on the underside of the block 35 and secures the assembly of quarter gear and bearings to the block. The block 35 is rotatable about the shaft 72 and is vertically slidable with respect to it so that it can be removed. A pawl 80 is pivoted at 81 to the block 35 and has a recessed jaw 82 which engages teeth 83 on the quarter gear 76. A compression spring 84 mounted between the block and the pawl 80 urges the pawl into engagement with the teeth 83. The pawl has an arm 85 connected to a slide 86 having a pull handle 87 at its free end. When the pull handle is slid outwardly with respect to the block 35, the block 35 and the footrest 30 mounted upon it can be swung horizontally to any one of a number of angular positions from zero degrees to 90° in 10° increments toward the outside of the bed.

Figure 1C:
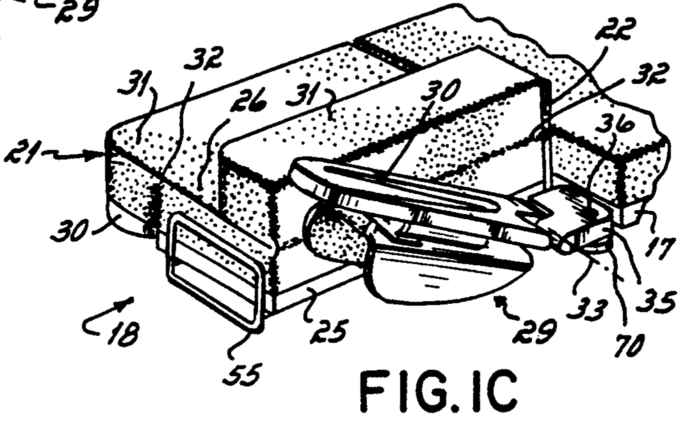
FIG. 1C is a fragmentary perspective view of the foot section showing the footrest in an angulated position.
Figure 2A:
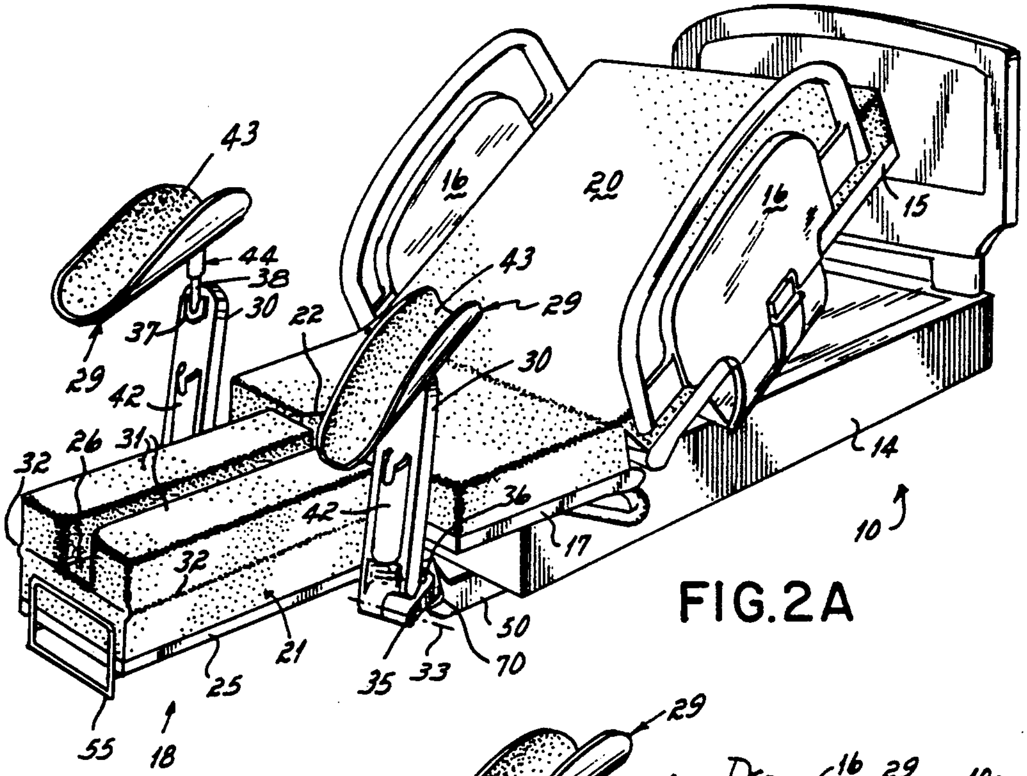
FIG. 2A is a fragmentary perspective view of the foot section showing the calf supports in position.
Figure 2B:
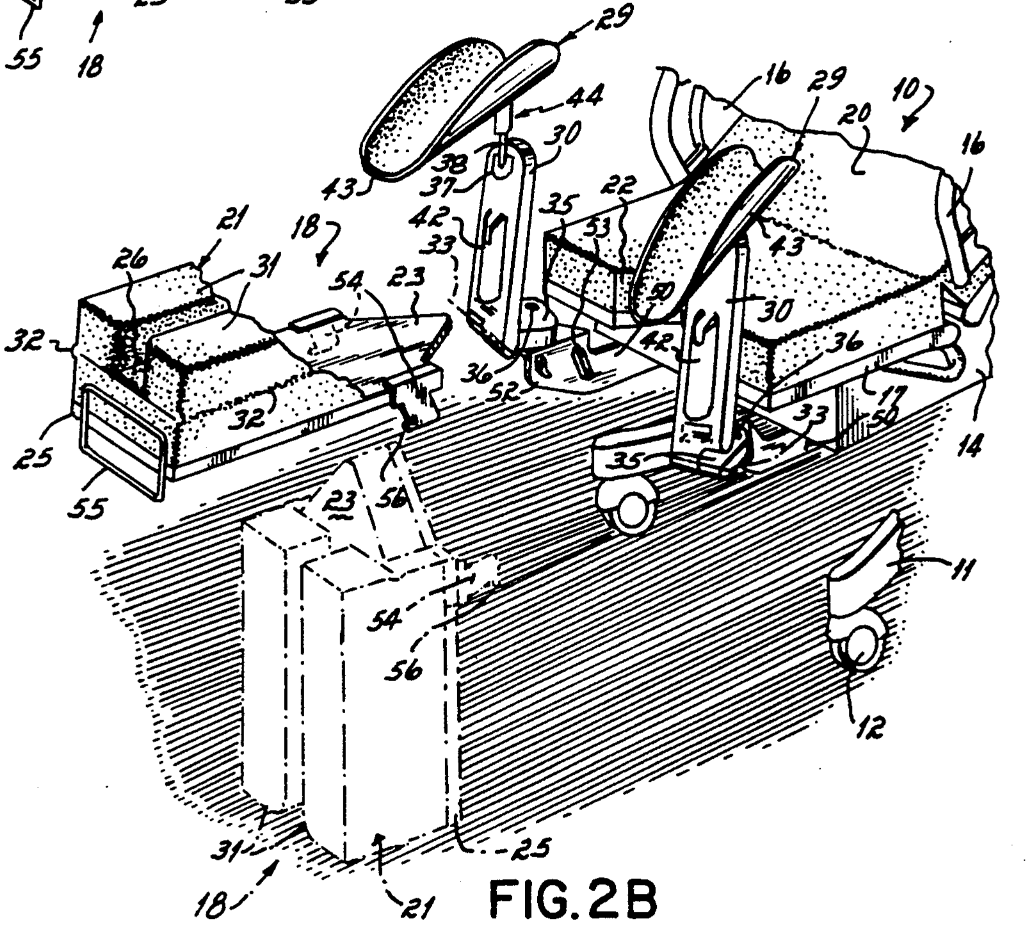
FIG. 2B is a fragmentary elevational view of the foot section showing the foot section removed from the main body of the birthing bed.
Figure 8:
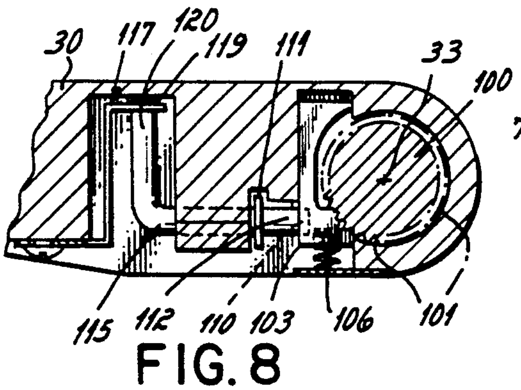
FIG. 8 is a cross-sectional view taken along lines 8—8 of FIG. 7.
Figure 6:
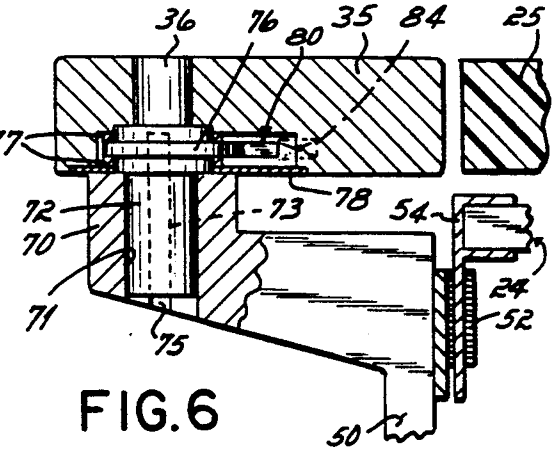
FIG. 6 is a cross-sectional view taken along lines 6—6 of FIG. 5.
Figure 7:
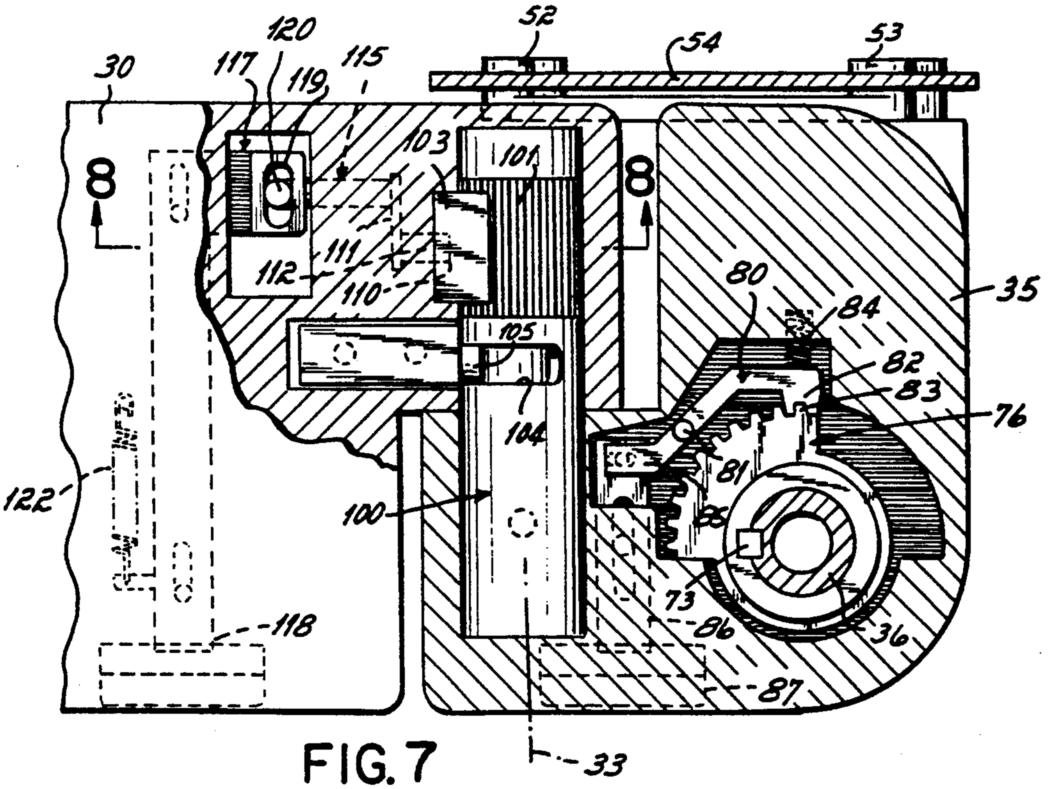
FIG. 7 is a cross-sectional view taken along lines 7—7 of FIG. 5.

As indicated above, the footrest can be ratcheted upwardly from its horizontal position as shown in FIG. 1B through the angular footrest position of FIG. 1C to a vertical position for mounting the calf support 29, as shown in FIGS. 2A and 2B. The mechanism for ratcheting the footrest is shown principally in FIGS. 7–9. The block 35 is fixed to a tubular shaft 100. The shaft has serrations 101 around a portion of its surface. A serrated pawl 103 is in engagement with the serrations 101 as shown in FIGS. 7 and 8. The pawl is slidable in the footrest 30. The pawl 103 controls the position of the footrest and maintains it in any selected position through 81° of upward swinging unless the pawl is released. The footrest will continue movement to 117°. The relationship of the respective serrations is such that the pawls permit the footrest to swing upwardly with the pawls ratcheting against the serrations but block movement downwardly. The serrations permit the footrest to swing past vertical to about 117°.

A partial annular slot 104 in the shaft 100 is engaged by a stud 105 mounted in the footrest. The slot 104 permits movement of the footrest through 117°, but blocks it in either direction outside of 117°.

The pawl 103 is urged by a compression spring 106 into engagement with the shaft 100. The pawl has a bore 110. Referring to FIGS. 7–9, a bracket 111 carries pin 112 that projects into the bore 110 in the pawl 103. An L-shaped actuating lever 115 is fixed to the bracket 111 to pivot the bracket 111. An L-shaped bar 117 having a pull handle 118 has a slot 119 which engages a leg 120 of the L-shaped lever 115. It can be seen from FIGS. 7 and 8 that pulling on the L-shaped bar will pivot the bracket 111 causinq the pin 112 to swing down as viewed in FIG. 8. When the arm 117 is pulled, the pawl will be moved out of engagement with the serrations in the shaft. A tension spring 122 returns arm 117 and, hence, the pawl 103 to its position of engagement with the shaft. The footrest 30 can be raised from its horizontal position to any one of a number of positions through to 117°. Then, by pulling on the arm 117, the pawl 103 releases and the footrest can be returned to its horizontal position.

Each receptacle of the calf support 29 has a ball joint 45 connecting it to a post 44. See FIGS. 11 and 12. The post 44 has a sleeve 130 mounted on the elongated post 38. The post has screw threads 131 on its upper end and has the spade 39 on its lower end. The spade 39 drops in the pocket 37 of the footrest to mount the calf support and prevent it from rotating with respect to the upper end of the footrest. The uppermost end of the post 38 has a reduced diameter portion 135. The sleeve 130 surrounding the upper end portion has an inwardly-directed annular flange 138 welded to the post 38. A seat 140 is slidable in the sleeve 130 and has a plurality of depending pins 141 passing through enlarged bores 142 in the annular flange 138. The lower ends of the pins are in engagement with the upper race of roller bearinqs 144. A sleeve 145 is threaded on the threaded portion 131 of shaft 38 and engages the lower race of bearings 144. A plastic grip 146 is fixed to the sleeve 145. A ball 150 connected by a stud 151 to the receptacle 43 rests upon the seat 140 and is captured within the sleeve 130 by an inwardly-directed rim 152 and ring 153. When the sleeve 145 is rotated in one direction, the rim pulls the ring 153 against the ball and clamps it against the seat to fix the position of the ball. When the sleeve is rotated in the opposite direction, the ball is released.

Figure 5:
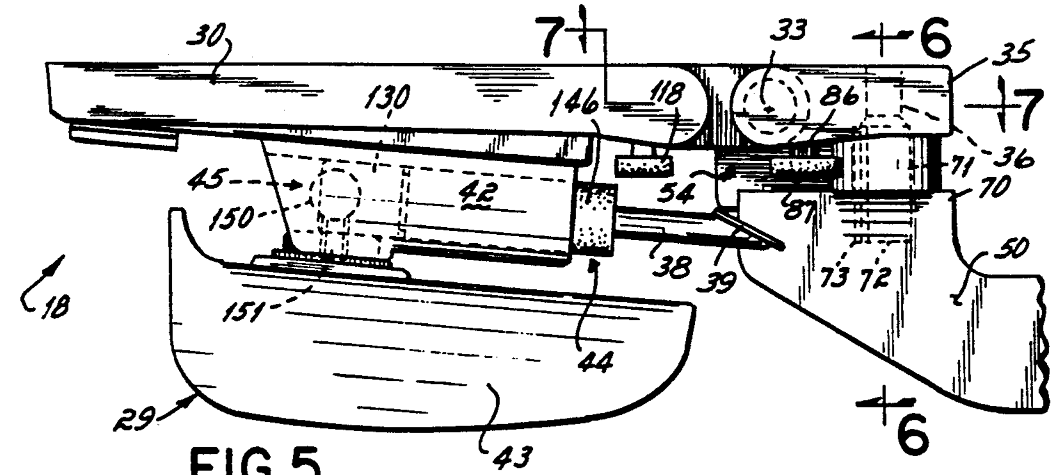
FIG. 5 is a side elevational view of the footrest taken along lines 5—5 of FIG. 3.

The stud must be capable of making a right angle pivot with respect to the post 44 so that the cap support 29 can be pivoted to lie generally parallel to the post 44 for the storage position as depicted in FIG. 5.

Figure 13:
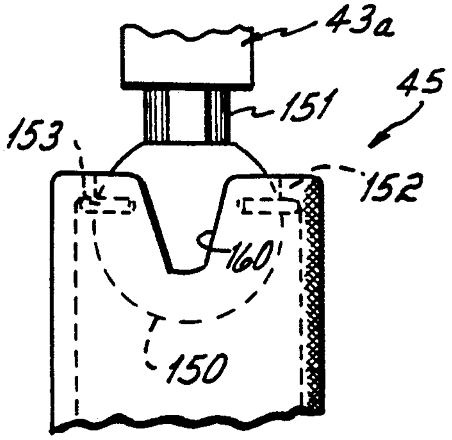
FIG. 13 is a fragmentary elevational view of the ball joint.
Figure 14:
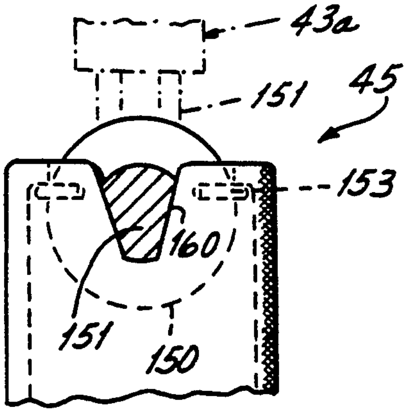
FIG. 14 is a fragmentary view similar to FIG. 13 showing the ball rotated 90°.
Figure 4B:
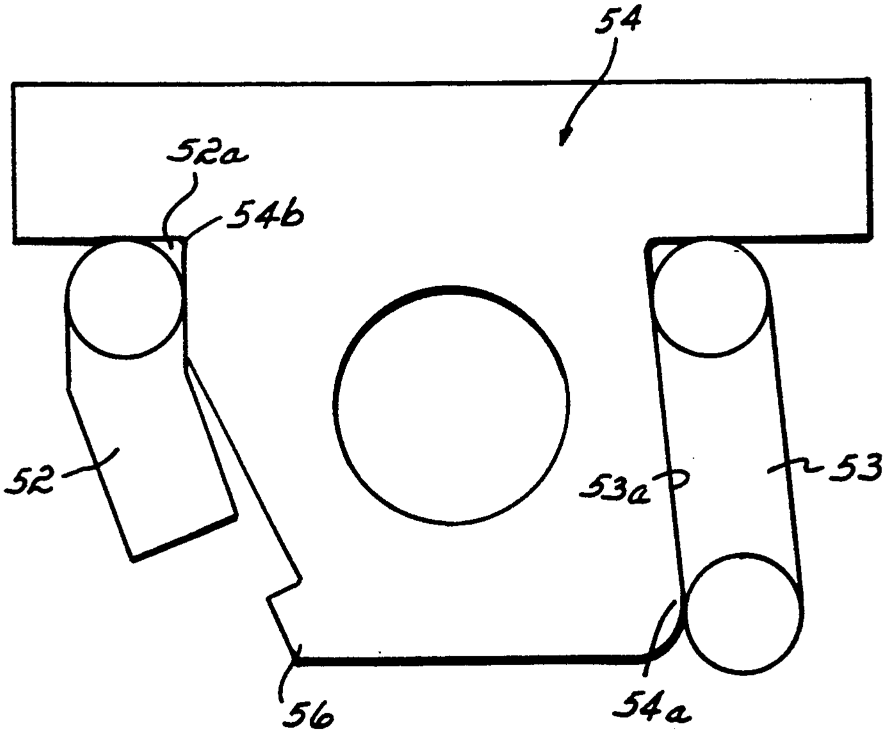
FIG. 4B is an enlarged view of the structure area 4B of FIG. 4.

To this end, the sleeve 130 has, at its upper end, a V slot 160 as shown in FIGS. 13 and 14. A stud 151 has a matching taper as best shown in FIG. 14 so that when the stud 151 and the cap support that it carries is pivoted with respect to the sleeve, the stud 151 will lie in the V slot 160 as shown in FIG. 14.

OPERATION

In the operation of the invention, the patient is seated on a seat panel 17 with legs comfortably resting on the mattress 21 of the leg section. When labor begins, the patient may wish to put her feet against the footrest to assist the contractions. Assuming the patient has been administered an epidural anesthetic, the patient's legs are numb. The attending nurse will place the patient's legs on one side of the footrest mattress and raise the pivotal section 31 on the other side as depicted in FIG. 1B. The footrest 30 is ratcheted upwardly as shown in FIG. 1C and the patient's foot is placed upon it. The opposite leg of the patient is then placed upon the now folded-over mattress portion 31 and the opposite lateral mattress section is folded upon the center section as shown, for example, in FIG. 2A. The opposite footrest is then ratcheted up to footrest position comparable to that of FIG. 1C and the patient's foot is placed upon it.

At the time of delivery, it may be desirable to raise the patient's calves and support them in a raised position. To make that transition, the footrests are raised to a vertical position. The calf supports 29 are removed from their holsters 42 and the spades 39 are inserted into the pockets 37 of the footrests. The angular position of each receptacle is adjusted to the desired position by rotating the sleeve 145 to free the ball 150 permitting the receptacle to be shifted. Thereafter the sleeve 145 is rotated to tighten the ring 153 against the ball, thereby fixing the calf support in the desired position.

The gynecologist may find it useful simply to sit on the mattress sections 31 as they appear in FIG. 2A. The foot section can, of course, be lowered by dropping the transverse beam 50 as described above to lower the calf rests and remaining mattress section. Alternatively, as shown in FIG. 2B, the central panel 25 and mattress sections can be removed simply by raising out of the lugs 52, 53 with the mattress section being stood on its rectangular stand 55 to minimize the space required for temporary storage of it in the birthing room.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof.

We claim:

1. A birthing bed comprising:

a bed frame, a pair of laterally-spaced, forwardly-projecting arms, means mounting said arms on said bed frame, each said arm having longitudinally-spaced lugs, a foot panel having laterally-spaced, depending tongues that are removably inserted between said lugs to mount said foot panel on said bed frame, one of said lugs being rearward of the other of said lugs and having a surface engaging said depending tongue, said tongue-engaging surface being inclined to vertical so as to overlie the surface of said tongue so that it engages and inhibits inadvertent disengagement of said tongue with said lugs, said foot panel being removable from said bed frame by lifting said foot panel with respect to said lugs.

* * * * * *